United States Patent
Bates et al.

(10) Patent No.: US 7,114,384 B1
(45) Date of Patent: Oct. 3, 2006

(54) ACOUSTIC ADIABATIC LIQUID QUANTITY SENSOR

(75) Inventors: Kenn S. Bates, Long Beach, CA (US); Kenneth M. Kunz, Northridge, CA (US); Barton H. Rowlett, Rancho Palos Verdes, CA (US); David B. Chang, Tustin, CA (US)

(73) Assignee: Hughes Aircraft Company, Los Angeles, CA (US)

( * ) Notice: Subject to any disclaimer, the term of this patent is extended or adjusted under 35 U.S.C. 154(b) by 0 days.

(21) Appl. No.: 08/015,665

(22) Filed: Feb. 9, 1993

Related U.S. Application Data

(63) Continuation of application No. 07/613,615, filed on Nov. 14, 1990, now abandoned.

(51) Int. Cl.
   *G01F 17/00* (2006.01)
   *G01F 23/18* (2006.01)
(52) U.S. Cl. .................................. 73/149; 73/290 V
(58) Field of Classification Search ................ 73/149, 73/290 B, 290 V
   See application file for complete search history.

(56) References Cited

U.S. PATENT DOCUMENTS

| | | | | |
|---|---|---|---|---|
| 3,237,451 A | * | 3/1966 | Haeff | 73/149 |
| 3,357,245 A | * | 12/1967 | Wolfrum | 73/290 B |
| 3,411,351 A | * | 11/1968 | Schwartz | 73/290 B X |
| 3,596,510 A | * | 8/1971 | Siegel et al. | 73/290 B X |
| 4,226,125 A | * | 10/1980 | Waugh | 73/708 |
| 4,704,902 A | * | 11/1987 | Doshi | 73/149 |
| 4,991,433 A | * | 2/1991 | Warnaka et al. | 73/290 V |

FOREIGN PATENT DOCUMENTS

| | | | | |
|---|---|---|---|---|
| JP | 164916 | * | 9/1984 | 73/149 |
| JP | 165719 | * | 7/1988 | 73/149 |
| JP | 246620 | * | 10/1988 | 73/149 |
| SU | 432344 | * | 6/1975 | 73/290 B |
| SU | 587333 | * | 1/1978 | 73/149 |
| SU | 1204943 | * | 1/1986 | 73/149 |
| SU | 1377595 | * | 2/1988 | 73/149 |
| WO | 3834 | * | 7/1986 | 73/149 |

OTHER PUBLICATIONS

"Gauging Fuel in Deformed Tanks by Pneumatic Methods—Application to Automobile Fuel Gauges," K. Watanabe, H. Ishizuka, SAE Technical Paper Series, International Congress and Exposition, Detroit, Michigan, Feb. 26-Mar. 2, 1990, pp. 1-8.

(Continued)

*Primary Examiner*—Thomas P. Noland
(74) *Attorney, Agent, or Firm*—Georgann S. Grunebach; Terje Gudmestad; W. K. Denson-Low

(57) ABSTRACT

An adiabatic liquid volume sensor system is described, which employs a main chamber in a back-to-back configuration with a reference chamber of known volume. The system measures liquid volume in the main chamber by making low frequency acoustic measurements of the acoustic pressure differences in the two closed chambers when driven with a sinusoidal frequency from the same speaker. Pressure transducers in each chamber measure acoustic adiabatic pressures in each chamber. The ratio of these pressures multiplied by the known volume of the reference chamber yields the volume of gas in the main chamber. The volume of liquid is equal to the known volume of the main chamber minus the calculated gas volume.

12 Claims, 2 Drawing Sheets

OTHER PUBLICATIONS

"Effects of Anti-Static Additives on Aircraft Capacitance Fuel Gaging Systems"; Technical Report AFWAL-TR-80-2058; Jun. 1980; Unclassified Technical Report Distributed by Defense Technical Information Center pp. iii-vii, pp. 1-49, plus 10 Unnumbered Pages.

"A Highly Accurate Fuel Level Measuring System"; SAE Technical Paper Series 871961; Oct. 19-22, 1987; K. Suzuki: et al. 12 pages.

"Electrical and Physical Nature of Microbiol Membranes Implicated in Aircraft Fuel Quantity, Probe Malfunction" SAE-710439; May 10-13, 1971; W. B. Engel et al.; pp. 1583, 3 Other Pages, p. 1590 (Reference Incomplete).

"Volume Measurement of Liquid in a Deformed Tank—Application to the Fuel Meter of Automobiles"; SAE Technical Paper Series, 871964; Oct. 19-22, 1987; Kajiro Watanabe et al.; pp. 1-10.

"Volumetric Fuel Quantity Gauge"; Nasa Case No. LAR 13147-1 (U.S. Appl. No. 06/643,523, now abandoned filed Aug. 23, 1984) Garner et al.

* cited by examiner

ACOUSTIC ADIABATIC LIQUID QUANTITY SENSOR

This is a continuation of application Ser. No. 07/613,615, filed Nov. 14, 1990 and now abandoned.

BACKGROUND OF THE INVENTION

The present invention relates to volume measuring sensors, and more particularly to a sensor for measuring the volume of air or ullage in a container or a tank, thereby providing an indication of the volume of a liquid, powder or solid occupying the remaining volume of the container.

Several factors have come to the fore in recent years to suggest that a new design for a fuel quantity gauge is becoming a necessity. With the advent of consumers desiring smaller automobiles, designers would like the flexibility of employing convoluted fuel tanks to achieve space efficiency. This will necessitate a change from the simple fuel level gauges in use today.

Consumers, having voiced their desire for longer and more inclusive warranties, are getting such from automobile manufacturers. As a consequence, manufacturers are looking for methods to lessen repair costs wherever possible. Presently if an automobile is brought in for repair because of a defective fuel gauge, the entire fuel tank is replaced. The cost of dissecting the old fuel tank and repairing the gauge is prohibitive. Manufacturers would like externally mounted or easily removable fuel sensors so that the good fuel tank would not have to be discarded, thereby reducing warranty repair costs.

An unlevel vehicle and/or fuel sloshing contribute sources of error to fuel level gauges. Considering the increasing amount of stops and starts for today's commuting driver, the fuel sloshing could render the fuel gauge inaccurate for a large fraction of the time. This enhances the need for a level and sloshing insensitive fuel quantity sensor.

The new dashboard displays can display a high degree of accuracy in their readouts. So much so, that now the limiting factor in the accuracy of reading the remaining fuel is no longer in the display but in the fuel quantity gauge itself. Car manufacturers would like more accurate fuel gauges.

These four compelling reasons indicate the definite need for a new or improved fuel quantity gauge.

Conventional gauges have been used in the measuring of fuel for years. The automobile with its relatively quiescent journey and limited elevation angle, typically employs the mechanical float sensor. This sensor detects level of fluid in the tank and is inexpensive. A simple mechanical float fuel sensor consists of a float (which always rides at the level of the fuel) and vertical rails which constrain the float. For a reference see E. W. Pike et al., "Investigation of Fuel Quantity Measuring Techniques," DTIC-AD712120, USAF-AMC Wright Patterson AFB, Ohio, June 1952. This sensor produces either a changing voltage or current as the float moves up and down along the rails. There have been numerous advances in the mechanical float sensor. However, most mechanical float sensors tend to suffer from the following general disadvantages: (1) Mechanical float sensors required some electricity within the fuel tank, disadvantageous from a safety standpoint. (2) Mechanical mechanisms of any sort break down with much higher regularity than any other system having no moving parts. (3) Mechanical floats have lower accuracies than other fuel gauges available today. (4) Mechanical float gauges measure only fuel level. This is a disadvantage as fuel sloshing, inclining of the road, and the convoluted fuel tank shapes of today decrease the accuracy of fuel level as a measure of fuel quantity.

Some aircraft use mechanical float sensors, but most use a coaxial capacitive sensor. Whichever sensor is used, a matrix of these sensors (from 4 to 12, typically) is typically used within each fuel tank inside the aircraft. There are several separate fuel tanks within an aircraft to take best advantage of this limited volume available in the wings and fuselage. This matrix of sensors and averaging electronics is required to allow some measure of accuracy during maneuvering and climbing. The capacitive sensor is also more accurate than the mechanical float sensor and can therefore provide better fuel management and less likelihood of running out of fuel. However the capacitive sensor is more expensive than the mechanical float sensor, making a matrix of such sensors prohibitively expensive for use in automobiles. Microbial growth in the fuel tank has been shown to affect the accuracy of this sensor. For references see W. B. Engle and R. M. Owen, "Electrical and Physical Nature of Microbial Membranes Implicated in Aircraft Fuel Quantity Probe Malfunction," SAE-710439, National Air Transportation Meeting, Atlanta, Ga., May 1971; J. Huddart, "An Alternative Approach to Fuel gauging," ASE-790138, Society of Automotive Engineers, Detroit, Mich., February/March 1979; K. Suzuki, T. Tomoda, and S. Momoo, "A Highly Accurate Fuel Level Measuring System," SAE-871961, Passenger Car Meeting, Dearborn, Mich., October 1987; P. Weitz and D. Sale, "Effects of Anti-Static Additives on Aircraft Capacitance Fuel Gauging Systems, AFWAL Wright Patterson AFB, Ohio, Technical Report #AFWAL-TR-80-2058, June 1980.

A fiber optic liquid level gauge is described in J. W. Berthod, "Fibre Optic Intensity Sensors," Photonics Spectra, 22(12), 125–138 (December 1988), and utilizes two fibers, a prism, an LED, and a detector. Multiple fiber sensors, each of different length, can be employed to provide an incremental level capability. The disadvantages of the fiber optic fuel gauge are: 1) the sensor must be located inside the tank, 2) films can form on the prism and foul the sensor, 3) the fiber optic sensor is a discrete sensor, and 4) the fiber optic sensor is a level sensor only.

There are two techniques associated with another known fuel sensor, the Boyle's Law or pressure fuel quantity gauge. (For references, see: H. Garner and W. Howell, "Volume Fuel Quantity Gauge" Patent Application, NASA-CASE-Lar-13147-1, Ser. No. 06/643/523 filed Aug. 23, 1984 and now abandoned. Takebayashi, "Volume measurement of liquid in a deformed tank," SAE-871964, Passenger car meeting, Dearborn, Mich., October, 1987.) The first technique (the Beckman method) uses isothermal compression to measure the volume of the gas. Any isothermal (constant temperature) change in volume is accompanied by a change in pressure. Measuring this pressure change, as a piston which is connected to the system collapses its volume, yields a measure of the entire tank volume. A major drawback of this technique is that it cannot work in a tank that has vent holes or leaks of any kind. Such leaks would not allow the pressure build up that is so critical to the measurement. A second method, proposed by Wantanabe and Takebayashi, id., uses an adiabatic (no heat flow) process and a step function of pressure to determine the volume of the air in the tank. This method can deal with small, medium, and large holes in the tank. The effect of leaks in the tank do not alter the outcome of the gauge; they only modify the relaxation time and damping of the pressure pulse in the tank. By noticing the speed of decay of the pressure after the step response, the gas volume can be determined. The disadvantages of this system are (1) the system is bulky and heavy, (2) the adiabatic system requires more complex electronics, and (3) the pistons and valves involved together with the electronics cause this gauge to be very expensive compared to other automobile fuel gauges.

It is therefore an object of the present invention to provide an improved system for measuring the gas volume in a closed container, which is reliable and relatively inexpensive to manufacture.

A further object is to provide an improved adiabatic pressure system for measuring the quantity of a liquid, solid or powder in a closed container of known empty volume.

Yet another object of this invention is to provide an improved fuel quantity gauge system for vehicles.

SUMMARY OF THE INVENTION

In accordance with one aspect of the invention, a system for measuring the volume $V_1$ of a gas in a main chamber is described. The system includes a reference chamber having a known volume $V_2$ mounted in a back-to-back configuration with a surface of the main chamber. Means are provided for equalizing the static gas pressure in the respective main and reference chambers. In a disclosed embodiment, the pressure equalizing means can be one or more open tubes communicating between the main and reference chambers.

An excitation transducer is mounted between and dividing the main and reference chambers to produce a volume displacement, when the transducer is excited, in the respective chambers. The excitation transducer can be, for example, an acoustic speaker device. An excitation source generates an excitation signal for driving the excitation transducer. The excitation signal may be, for example, a sinusoidal signal in the frequency range 1 to 500 Hz in a particular example.

The system further includes a main chamber pressure transducer disposed within the main chamber for providing a main transducer signal indicative of the differential gas pressure $\Delta P_1$ in the main chamber caused by the volume displacement produced by the excitation transducer. A reference chamber pressure transducer is disposed within the reference chamber for providing a reference transducer signal indicative of the differential gas pressure $\Delta P_2$ in the reference chamber caused by said volume displacement. The pressure transducers can comprise, for example, acoustic microphones.

The system further includes means responsive to the main and reference transducer signals for providing a signal indicative of the gas volume $V_1$ in the main chamber. The signal providing means develops the signal indicative of the volume $V_1$ based on the following relationship $$V_1 = V_2(\Delta P_2/\Delta P_1)$$

In accordance with a further aspect of the invention, the foregoing system can be employed as a system for determining the quantity of a liquid, powder or solid material in a main chamber of known empty volume. The volume of such material is simply determined by subtracting the measured volume of gas $V_1$ from the known empty volume of the main chamber to obtain the volume of such material in the main chamber. Thus, the invention may be used as a fuel volume gauge in a vehicle, for example.

BRIEF DESCRIPTION OF THE DRAWING

These and other features and advantages of the present invention will become more apparent from the following detailed description of an exemplary embodiment thereof, as illustrated in the accompanying drawing, in which.

DETAILED DESCRIPTION OF THE PREFERRED EMBODIMENT

An adiabatic system in accordance with the invention measures liquid volume by making low frequency acoustic measurements of the acoustic pressure differences in two closed chambers when fed with a sinusoidal frequency from the same speaker. The invention uses a back-to-back reference-chamber-to-main-chamber configuration. This allows the use of one transducer to produce the same volume displacement ($\Delta V$) in both chambers with no valves. Also a frequency regime can be used which allows speaker transducers to be used. A system embodying this invention is able to produce its volume reading and is inherently well compensated for changes in temperature, specific heat ratio (due to differences in the vapor mixture in the chambers), and drift.

Figure 1:
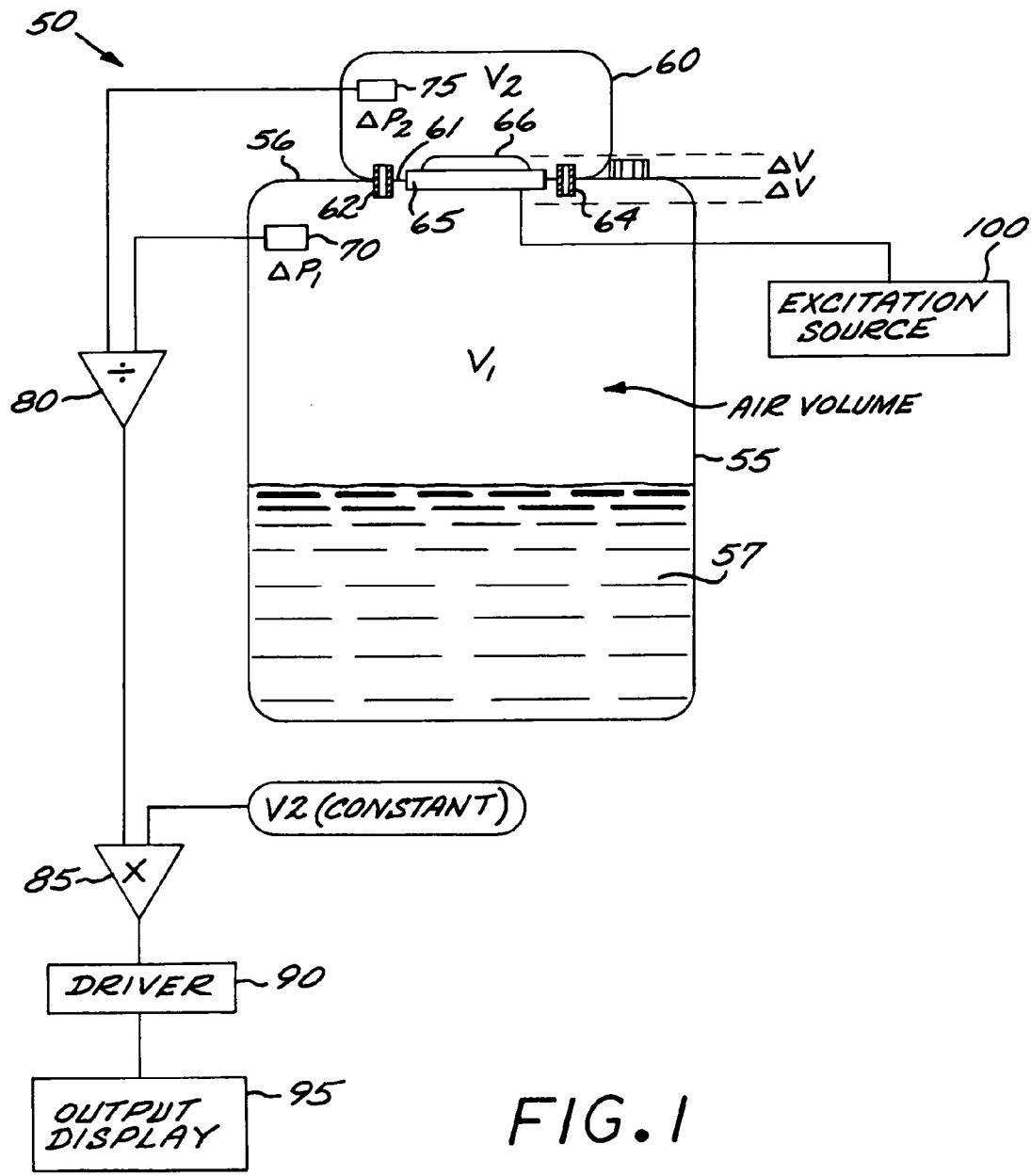
FIG. 1 is a schematic block diagram of a liquid quantity sensor embodying the invention.

Referring now to FIG. 1, an adiabatic liquid quantity sensor 50 in accordance with the invention is illustrated in simplified schematic form, and comprises two chambers, the main chamber or "tank" 55 which holds the liquid 57 to be measured, and the reference chamber 60. The volume of both chambers is known. No liquid is held in the reference chamber; hence, the volume of gas in the chamber 60 is equal to the empty chamber volume $V_2$. In the arrangement shown in FIG. 1, the two chambers adjoin one another at the top surface 61 of the main chamber 60 and the bottom surface 61 of the reference chamber 60. Since this system measures the volume $V_1$ of the gas in the chamber 55, the configuration is selected to ensure that the communication between the two chambers is located so that the liquid 57 does not cover or obstruct the area of communication between the chambers.

The sensor system 50 further includes an emitting transducer 65, which may typically comprise an acoustic speaker, and two pressure measurement transducers 70 and 75 (typically acoustic microphones) to measure the acoustic pressure from the emitting transducer 60 in each of the two chambers 55 and 60. The transducer 65 is mounted in the exemplary embodiment in a common opening in the top surface 56 of the main chamber 55 and the bottom surface 61 of the reference chamber. The transducer 65 comprises an electro-mechanically driven membrane or diaphragm 66 which, in combination with other structure of the transducer 65, essentially covers and seals the common opening between the two chambers into which the transducer is fitted. In the case of a sensor system employed to measure the volume of petroleum fuel for a vehicle, the diaphragm should be coated with a material to resist the fuel vapors. The transducer 65 further includes means for driving the diaphragm 66, e.g., a coil driven by an excitation source 100, into the main chamber 55 or the reference chamber 60, thereby effectively producing respective volume changes $\Delta V$ in the respective chamber. These volume changes produce corresponding pressure changes $\Delta P_1$ and $\Delta P_2$ in the respective pressures of the gas in the main chamber 55 and the reference chamber 60.

As will be appreciated by those skilled in the art, typical acoustic microphones used as transducers 70 and 75 measure changes in acoustic pressure. In this embodiment the microphones 70 and 75 measure dynamic quantities, i.e., the dynamic pressure changes $\Delta P_1$ and $\Delta P_2$. If the volumes $V_1$ and $V_2$ are expected to be the same, then the transducers 70 and 75 will preferably be identical, i.e., of equal sensitivities. However, in a typical application for the invention, the gas volume $V_1$ in the main chamber will typically be much larger than the volume $V_2$ of the reference chamber. Thus, in the typical case, the transducer 70 which measures the acoustic pressure change in the main chamber will be more sensitive than the transducer 75 which measures the acoustic pressure change in the reference chamber 60.

Figure 2:
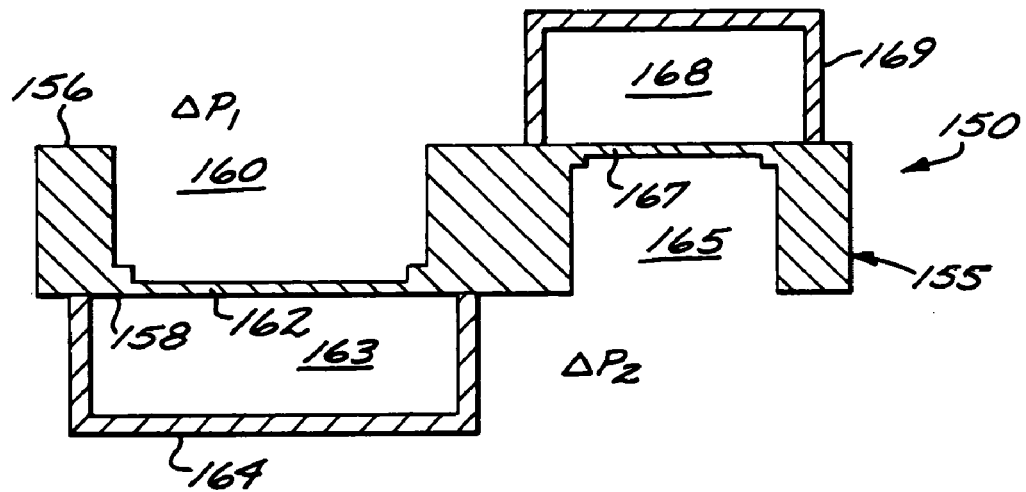
FIG. 2 is a simplified cross-sectional diagram of a micro-machined dual strain gauge pressure transducer suitable for use in the sensor of FIG. 1.

A preferred implementation of the pressure transducers 70 and 75 is in the form of a pair of silicon strain gauge transducers mounted on a single silicon chip, with the membrane for the transducer 70 being larger than the membrane for the transducer 75 to provide increased sensitivity for the main chamber transducer. The chip could be mounted in the common wall between the two chambers. FIG. 2 shows an exemplary embodiment of such a silicon strain gauge transducer 150 in simplified cross-sectional view. Here, a layer 155 of silicon is micromachined, using similar techniques to those used in the fabrication of monolithic integrated circuits, to form the open areas 160 and 165, by etching the respective surfaces 156 and 158 of the silicon wafer 155. The area 160 is larger than area 165, and faces into the main chamber whose ullage is to be measured. The area 165 faces into the reference chamber of the system. Respective transducer chamber housings 164 and 169 serve to define the transducer chambers 163 and 168, and isolate the respective membranes 162 and 167 from the effects of pressure variations $\Delta P_2$ and $\Delta P_1$. The membranes flex as air pressure fluctuations occur in the respective main and reference chambers. The flexing of the respective silicon membranes induces both radial and tangential stresses, which causes a piezoresistive change in the silicon, which is manifested by a different current flow through resistors diffused in the membrane. Thus, each transducer includes a means for applying a voltage potential across (or current through) the piezoresistive membrane, i.e., over a small area of the membrane, and means responsive to the voltage (or current) fluctuations to indicate such fluctuations; the larger the current fluctuation, the larger the air pressure fluctuation. Such means are not shown in FIG. 2, but can readily by constructed, e.g., by forming contacts at specific points on the membrane. A voltage drop across the resistor or current through the resistor can be monitored by appropriate circuitry, e.g., by incorporating the element as one arm of a Wheatstone bridge. Typically four piezoresistive elements located on one membrane are used, forming the four arms of the Wheatstone bridge.

The transducers of FIG. 2 provide the advantage that drift in sensitivity over time will effectively be cancelled, since the drifts of each transducer should track closely.

One or more passageways, e.g., thin hollow tubes 62, 64 provide a means for equalizing the static pressure of the gases in the respective chambers 55 and 60. The tubes 62, 64 in this embodiment extend through the upper surface 56 of the main chamber 55 and the lower chamber 61 of the reference chamber and are open at each end thereof. These tubes also provide a means allowing mixing of the gases between the two chambers so that the gases of both chambers have substantially the same fuel vapor content. If the two chambers held dissimilar gases, the measurement accuracy could be adversely affected. The tubes 62, 64 are made long enough and thin enough so that acoustic energy generated by the transducer 65 is blocked during the measuring mode.

The dimensions of the tubes 62, 64 are determined by the desired characteristic acoustic cutoff frequency of the tubes. Acoustic energy of frequencies below this cutoff frequency allow the pressure waves to flow through the tubes. The tubes do not allow acoustic energy of frequencies above the cutoff frequency to pass through the tubes. Thus, when the system is being operated in a measurement mode to measure the ullage in the main chamber, the excitation frequency should be above the tube characteristic cutoff frequency. The cutoff frequency $\omega_c$ can be derived using transport and diffusion theory to yield $$\omega_c = (\rho \eta)/r^2$$

where the tube is of radius r and length 1, $\rho$ is the density of air (on the order of $10^{-3}$ g/cm$^3$), and $\eta$ is the viscosity of air ($190 \times 10^{-6}$ poises). Typical dimensions of the tube might yield a cutoff frequency of ½ Hz.

Electronic circuitry is employed to divide the pressure outputs $\Delta P_1$ and $\Delta P_2$, and operate the display. Thus, a ratio obtaining circuit 80 is responsive to the pressure outputs from transducers 70 and 75 to provide an output signal indicative of their ratio ($\Delta P_1/\Delta P_2$).

The electronics further include a multiplication circuit 85 which multiplies the ratio of the two pressures by the known volume V2 of the reference chamber 60. Display driver device 90 drives an output display 95 to provide a continuous or discrete readout indicative of the liquid volume in the tank 55.

The emitting transducer 65 is driven by the excitation source 100, which may provide a sinusoidal excitation signal. The frequency should be selected so that the frequency is high enough that the compressions and rarefactions are nearly adiabatic (i.e., there is little heat flow to the walls of the chambers during a half-cycle of the acoustic signal), and low enough that standing waves, Helmholtz, or other resonations are not excited. The frequency of the excitation signal will depend on the particular application, but may typically be expected to be in the range of 1 Hz to 500 Hz for automobile fuel quantity gauges. Of course, it is not necessary for operation of the invention that the drive signal be sinusoidal. Other types of signals can be employed successfully in particular applications, e.g., square wave or white noise.

To ensure mixing of the gases between the respective chambers 55 and 60 through the tubes 62, 64 an external pump or fan may be employed to circulate the vapor through an opening which is normally closed, e.g., using a mechanical valve. Alternatively, the excitation transducer 65 may be driven at a much lower drive frequency, below the characteristic cutoff frequency of the tubes 62 and 64 at periodic intervals (e.g., every five minutes or so), thereby causing gas flow through the tubes 62 and 64. Thus, the source 100 may alternatively drive the transducer 65 with the low frequency in a mixing mode for the gas mixing function and with the frequency employed to measure the gas volume in the main chamber during a measurement mode.

To explain the operation of the system 50, assume an adiabatic gas such as air fills the reference chamber 60 and that part of the main chamber not occupied by the liquid 57, where P=pressure, V=volume, γ=specific heat ratio, and K is a constant. The equation governing the effect can be worked out simply, starting from the equation of state for an adiabatic gas, $$PV^\gamma = K \quad (1)$$

Taking the differential of the equation, $$d(PV^\gamma) = d(K) = 0 \quad (2)$$

$$dPV^\gamma + P\gamma V^{\gamma-1} dV = 0 \quad (3)$$

$$(dP/P) = -\gamma(dV/V) \quad (4)$$

For different volumes fed by the same $\Delta V$ disturbance, $$(dP_1/P_0)(V_1/dv) = -\gamma = (dP_2/P_0)(V_2/dV), \quad (5)$$

where it is assumed that $P_o$ and $\gamma(t, f_m)$ are the same for both chambers. Therefore, $$V_1 = V_2(\Delta P_2/\Delta P_1) \quad (6)$$

From eq. 6 it can be seen that if the ratio of the acoustic adiabatic pressures ($\Delta P_2/\Delta P_1$) is measured in the two chambers 55 and 60 (produced by the same $\Delta V$ source) and multiplied by the known volume $V_2$ of the reference chamber 60, the volume $V_1$ of air in the main chamber 55 can be computed. The known empty chamber (55) volume minus the computed air volume yields the volume of the liquid (or fuel, or powder, or solid) in the chamber 55.

The adiabatic fuel quantity sensor system 50 has several advantages over conventional types of fuel gauges. The sensor system measures liquid volume as opposed to liquid height. Most other quantity gauges measure liquid height. Measuring liquid volume allows an accurate reading while the automobile resides on an incline, while the fuel is sloshing, or when automobile designers opt to use convoluted or non-rectangular tanks.

The frequency range for the sensor is chosen so that acoustic speakers can be used instead of bulky and expensive pistons, such as are used in the method described by Wantanabe and Takebayashi, id. By way of example, the frequency range for a particular example might be 1 Hz to 500 Hz.

The chambers are arranged back-to-back so that one speaker can be used to excite both chambers. Both chambers experience the same $\Delta V$ signal, but 180 degrees out of phase. This reduces the cost from a two speaker system or a one piston and several valve and feed tube system.

Communication tubes 62 and 64 between the reference chamber 60 and the main chamber 55 allow correction for the fuel-tank-specific problems such as the change in the temperature, pressure, specific heat ratio, and the acoustic speed of sound in the presence of butane gas or other vapors by allowing the vapors in each chamber to mix to achieve substantial homogeneity in the characteristics of the gases in the respective chambers.

The sensor produces a volume reading solely from a ratio measurement of pressures in both tanks and the known volume of the reference chamber—no other calibration is required. This is a tremendous advantage over other methods. Additionally, to improve on the signal-to-noise ratio of the pressure signals, then synchronous detection techniques for these signals can be used. Synchronous detection is the well-known method of mixing the signal with the driver oscillations so that only the component of the signal which is both in phase (or a fixed phase shift) and at the same frequency of the driver oscillations is measured.

Instead of calculating the volume $V_1$ in real time, the ratio value ($\Delta P_2/\Delta P_1$) may be used to address a look-up table of values which directly indicated the desired measured value corresponding to the particular ratio value, e.g., the volume of fuel remaining the fuel tank of a vehicle. In such an implementation, the contents of the look-up table are pre-computed, each corresponding to a particular ratio value.

The invention will operate with main chambers equipped with a form of pressure relief, e.g., the type of venting systems now employed with automobiles, which open when the pressure exceeds a predetermined value. Presently, this predetermined pressure corresponds to about 50 inches of water (2 pounds per square inch). The pressure differentials $\Delta P_1$ and $\Delta P_2$ can be selected to be much smaller than the pressure relief value.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A system for measuring the volume V1 of a gas in a main closed chamber, comprising:

a reference chamber having a known volume V2 and mounted in a back-to-back configuration with a common surface of said main chamber, the surface between and dividing the main and reference chambers;

means disposed in said surface for equalizing the static gas pressure in the respective main and reference chambers, wherein said equalizing means comprises one or more open passages disposed in said surface communicating between said reference chamber and said main chamber;

an excitation transducer for producing a volume displacement of the same magnitude in the respective chambers;

an excitation source for generating an excitation signal for driving the excitation transducer;

a main chamber pressure sensing means for providing a main transducer signal indicative of the differential gas pressure P1 in the main chamber caused by the volume displacement;

a reference chamber pressure sensing means for providing a reference transducer signal indicative of the differential gas pressure P2 in the reference chamber caused by said volume displacement; and means responsive to the main and reference transducer signals for providing a signal indicative of the gas volume V1 in the main chamber.

2. A system for measuring the volume of a liquid, powder or solid material in a main closed chamber of known empty volume, comprising;

a reference chamber having a known empty volume V2 and mounted adjacent a surface of said main chamber;

means for equalizing the static gas pressure in the respective main and reference chambers, wherein said equalizing means comprises one or more open passages disposed in said surface communicating between said reference chamber and said main chamber;

an excitation transducer mounted between and dividing the main and reference chambers to produce a volume displacement in the respective chambers;

an excitation source for generating an excitation signal for driving said excitation transducer;

a main chamber pressure transducer disposed within said main chamber for providing a main transducer signal indicative of the differential gas pressures $\Delta P_1$ in the main chamber caused by the volume displacement;

a reference chamber pressure transducer disposed within said reference chamber for providing a reference transducer signal indicative of the differential gas pressure $\Delta P2$ in the reference chamber caused by said volume displacement; and means responsive to the main and reference transducer signals for providing a signal indicative of the gas volume of said material in the main chamber in dependence on said known empty volume and said reference chamber volume V2.

3. The system of claim 2 wherein said transducer drive signal is in the frequency range 1 Hz to 500 Hz.

4. A quantity gauge system for measuring the volume of a solid, gas, or liquid material in a main closed chamber of known empty volume, comprising:

a reference chamber having a known empty volume V2 and mounted in a back-to-back configuration with a surface of said main chamber;

means for equalizing the static gas pressure in the respective main and reference chambers;

an excitation transducer for producing a volume displacement in the respective chambers;

an excitation source for generating an excitation signal for driving the excitation transducer;

a main chamber pressure sensing means for providing a main transducer signal indicative of the differential gas pressure P1 in the main chamber caused by the volume displacement;

a reference chamber pressure sensing means for providing a reference transducer signal indicative of the differential gas pressure P2 in the reference chamber caused by said volume displacement;

means responsive to the main and reference transducer signals for providing a quantity signal indicative of the quantity of material in the main chamber in dependence on said volume V2 and said known empty volume of said main chamber, wherein said equalizing means comprises one or more open passages communicating between said reference chamber and said main chamber, said passages characterized by a characteristic cutoff frequency, and wherein during a system measurement mode of operation when said volume of said material in said main chamber is to be measured, the frequency or frequencies of said transducer drive signal is greater than said cutoff frequency.

5. The system of claim 4 wherein said reference chamber is mounted in a back-to-back configuration with a top surface of said main chamber.

6. The system of claim 4 wherein said material is a fuel, said system further comprising means for mixing the gases between said main and reference chambers so that the gases of both said chambers have substantially the same fuel vapor content.

7. The system of claim 4 further comprising means operable during a gas mixing mode for exciting said excitation transducer with an excitation frequency below said cutoff frequency, thereby mixing the vapors between said main and reference chambers.

8. The system of claim 4, wherein said excitation transducer is mounted in said surface.

9. A system for measuring the volume $V_1$ of a gas in a main closed chamber, comprising:

a reference chamber having a known volume $V_2$ and mounted in a back-to-back configuration with a common surface of said main chamber, the surface between and dividing the main and reference chambers;

means disposed in said surface for equalizing the static gas pressure in the respective main and reference chambers, said equalizing means comprising one or more open passages communicating between said reference chamber and said main chamber, said one or more passages characterized by a characteristic cutoff frequency;

an excitation transducer for producing a volume displacement in the respective chambers;

an excitation source for generating an excitation signal for driving the excitation transducer, wherein the frequency or frequencies of said excitation signal is selected so that compressions and rarefactions of the gases in said main and reference chambers resulting from said excitation signal are nearly adiabatic, and standing waves and resonances are not excited in said chambers;

a main chamber pressure sensing means for providing a main transducer signal indicative of the differential gas pressure $\Delta P_1$ in the main chamber caused by the volume displacement;

a reference chamber pressure sensing means for providing a reference transducer signal indicative of the differential gas pressure $\Delta P_2$ in the reference chamber caused by said volume displacement; and means responsive to the main and reference transducer signals for providing a signal indicative of the gas volume $V_1$ in the main chamber; and wherein during a system measurement mode of operation when said volume of gas in said main chamber is to be measured, said excitation signal is characterized by frequency components greater than said cutoff frequency.

10. The system of claim 9 further comprising means operable during a gas mixing mode for exciting said excitation transducer with an excitation frequency below said main and reference chambers.

11. A system for measuring the volume of a liquid, powder or solid material in a main closed chamber of known empty volume, comprising:

a reference chamber having a known empty volume $V_2$ and mounted back-to-back with a surface of said main chamber, the surface between and dividing the main and reference chambers;

means disposed in said surface for equalizing the static gas pressure in the respective main and reference chambers, said equalizing means comprising one or more open passages communicating between said reference chamber and said main chamber, said one or more passages characterized by a characteristic cutoff frequency;

an excitation transducer for producing a volume displacement in the respective chambers;

an excitation source for generating an excitation signal for driving said excitation transducer;

a main chamber pressure sensing means for providing a main transducer signal indicative of the differential gas pressure $\Delta P_1$ in the main chamber caused by the volume displacement;

a reference chamber pressure sensing means for providing a reference transducer signal indicative of the differential gas pressure $\Delta P_2$ in the reference chamber caused by said volume-displacement;

means responsive to the main and reference transducer signals for providing a signal indicative of the gas volume of said material in the main chamber in dependence on said known empty volume and said reference chamber volume $V_2$; and wherein during a system measurement mode of operation when said volume of said gases in said main chamber is to be measured the frequency or frequencies of said excitation signal is greater than said cutoff frequency.

12. The system of claim 11 further comprising means operable during a gas mixing mode for exciting said excitation transducer with an excitation frequency below said cutoff frequency, thereby mixing the vapors between said main and reference chambers.

* * * * *